(12) United States Patent
Aso et al.

(10) Patent No.: US 7,650,849 B2
(45) Date of Patent: Jan. 26, 2010

(54) INDICATOR FOR A/T VEHICLE

(75) Inventors: Yusuke Aso, Hiratsuka (JP); Tomohiro Takahira, Shizuoka (JP)

(73) Assignees: Nissan Motor Co., Ltd., Yokohama-shi (JP); Fuji Kiko Co., Ltd., Kosai-shi (JP)

( * ) Notice: Subject to any disclaimer, the term of this patent is extended or adjusted under 35 U.S.C. 154(b) by 434 days.

(21) Appl. No.: 11/562,097

(22) Filed: Nov. 21, 2006

(65) Prior Publication Data

US 2007/0119360 A1    May 31, 2007

(30) Foreign Application Priority Data

Nov. 25, 2005  (JP)  ............................ 2005-340806
Sep. 14, 2006  (JP)  ............................ 2006-249864

(51) Int. Cl.
B60K 20/00  (2006.01)
(52) U.S. Cl. .................. 116/28.1; 116/35 A; 74/473.18; 74/473.3
(58) Field of Classification Search ................ 116/28.1, 116/35 A; 74/523, 473.18, 473.3; 180/90.6
See application file for complete search history.

(56) References Cited

U.S. PATENT DOCUMENTS

| 3,086,609 | A |   | 4/1963 | Bryant, Jr. |
| 3,285,093 | A | * | 11/1966 | Sellmeyer ..................... 74/566 |
| 5,855,182 | A | * | 1/1999 | Kline et al. ................. 116/28.1 |
| 5,862,708 | A | * | 1/1999 | Shamoto .................. 74/473.18 |
| 5,979,263 | A | * | 11/1999 | Tomida et al. ............. 74/473.3 |
| 6,044,790 | A | * | 4/2000 | Murakami .................. 116/28.1 |
| 6,046,673 | A | * | 4/2000 | Michael et al. ............. 340/456 |
| 7,017,436 | B2 | * | 3/2006 | Winchell ..................... 74/18.1 |
| 7,201,077 | B2 | * | 4/2007 | Yamamoto et al. ........ 74/473.18 |
| 2004/0237693 | A1 | * | 12/2004 | Koide ........................ 74/473.18 |
| 2005/0000310 | A1 |   | 1/2005 | Yamamoto et al. |
| 2007/0247293 | A1 | * | 10/2007 | Lienenkamp ............... 340/441 |

FOREIGN PATENT DOCUMENTS

| DE | 202 17 387 U1 | 2/2003 |
| EP | 1 331 421 A2 | 7/2003 |
| FR | 2 868 996 A1 | 10/2005 |
| JP | 2005-1401 A | 1/2005 |

* cited by examiner

*Primary Examiner*—R. A. Smith
*Assistant Examiner*—Tania C Courson
(74) *Attorney, Agent, or Firm*—Foley & Lardner LLP

(57) ABSTRACT

An indicator for an AT vehicle is disclosed wherein even when a shift lever boot is greatly flexed downward during shift operation of a shift lever, boot penetration restricting device, provided inside an open window of an indicator, prevents the shift lever boot from flexing and penetrating into a lower area of the open window portion.

10 Claims, 7 Drawing Sheets

US 7,650,849 B2

INDICATOR FOR A/T VEHICLE

BACKGROUND OF THE INVENTION

The present invention relates to an indicator for an A/T vehicle.

An indicator for an A/T vehicle has heretofore been known which has a shift lever boot, made of soft material such as leather or the like, which is mounted on an area around a shift lever with a view to getting an external appearance and texture like those of an M/T vehicle (see, for instance, Japanese Unexamined Patent Application Laid-Open Publication No. 2005-1401 on Page 5 and FIG. 1).

SUMMARY OF THE INVENTION

However, such an indicator for the A/T vehicle has a shift lever move permit hole, exposed in close proximity to a lower area of an open window portion through which a shift lever of the indicator extends, which has a first move permit hole permitting the shift lever to move in a vehicle's longitudinal direction to make it possible to select a range in an automatic mode and a second move permit hole permitting the shift lever to move in a vehicle's lateral direction to make it possible to select a range in a manual mode.

Therefore, under a range position in which the shift lever is greatly moved in the vehicle's longitudinal direction or the vehicle's lateral direction, a front area or a rear area of the shift lever boot is caused to flex in a great extent and penetrate into the open window portion. Thus, the shift lever boot is provable to be bitten between the shift lever and a peripheral edge of the shift lever move permit hole.

It is, therefore, an object of the present invention to provide an indicator for an A/T vehicle that even if a shift lever boot is caused to greatly flex downward due to shift operation of a shift lever, is operative to restrict the penetration of the shift lever boot for preventing the shift lever boot from being bitten between the shift lever and a peripheral edge of a shift lever move permit hole.

With the indicator of the A/T vehicle according to the present invention, the shift lever boot, made of soft material, is attached to an area covering a peripheral edge portion of the open window portion, through which the shift lever extends, and an upper end portion of the shift lever protruding upward from the open window portion. Further, boot penetration restricting device is provided to restrict the shift lever boot from flexing and penetrating into a lower area of the open window portion.

According to an aspect of the present invention, the boot penetration restricting means is operative such that even if the shift lever boot is flexed downward in a great extent due to shift operation of the shift lever, the shift lever boot is prevented from flexing and penetrating into the lower area of the open window portion.

Therefore, the boot penetration restricting means restricts the flexing and penetrating of the shift lever boot. As a result, even if the shift lever move permit hole is located in close proximity to the lower area of the open window portion, the shift lever boot can be reliably prevented from being bitten between the shift lever and the peripheral edge of the shift lever move permit hole.

DETAILED DESCRIPTION OF THE PREFERRED EMBODIMENTS

Now, various embodiments according to the present invention are described below in detail with reference to the accompanying drawings.

Figure 1:
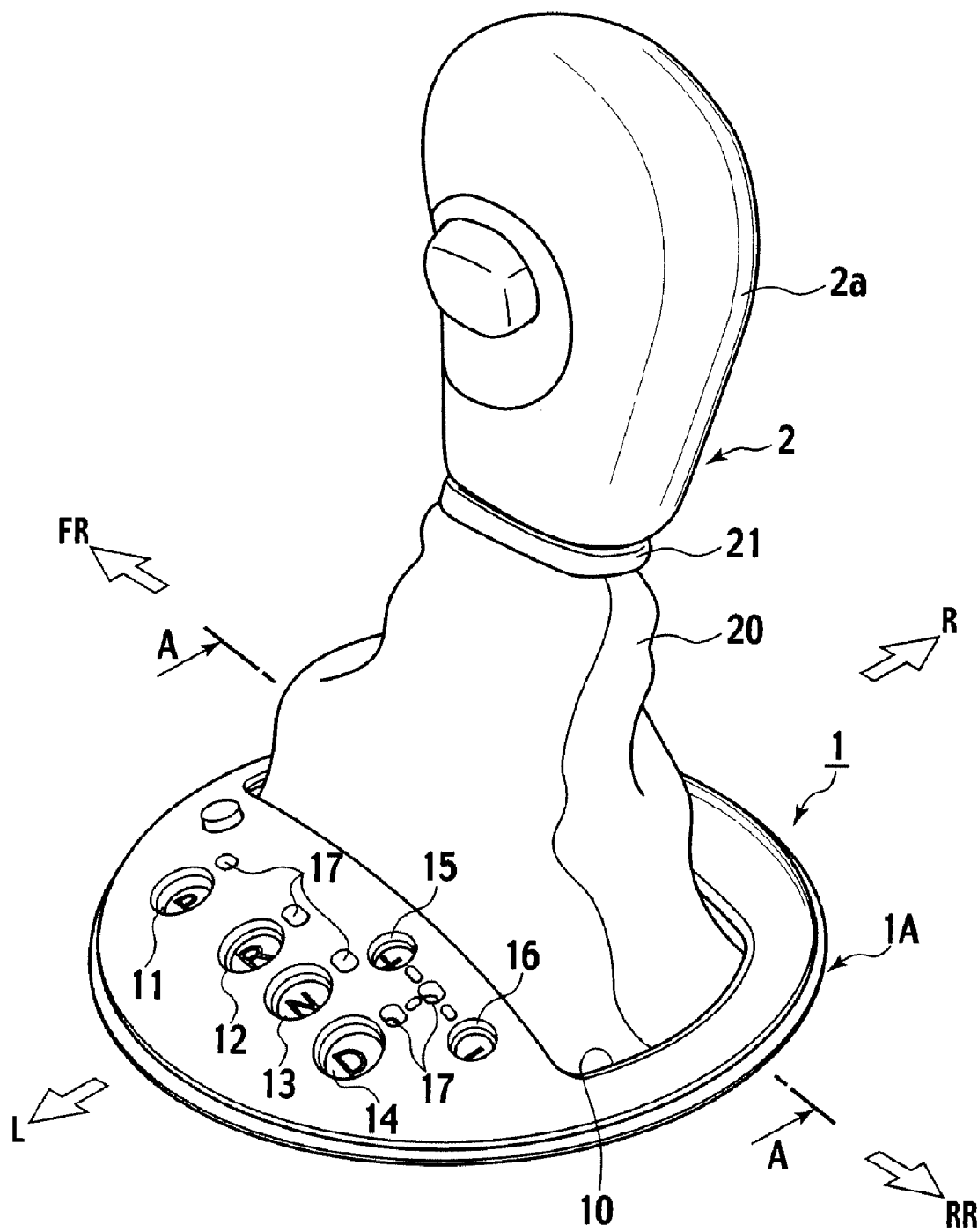
FIG. 1 is a perspective view showing an overall structure of a first embodiment according to the present invention.
Figure 2:
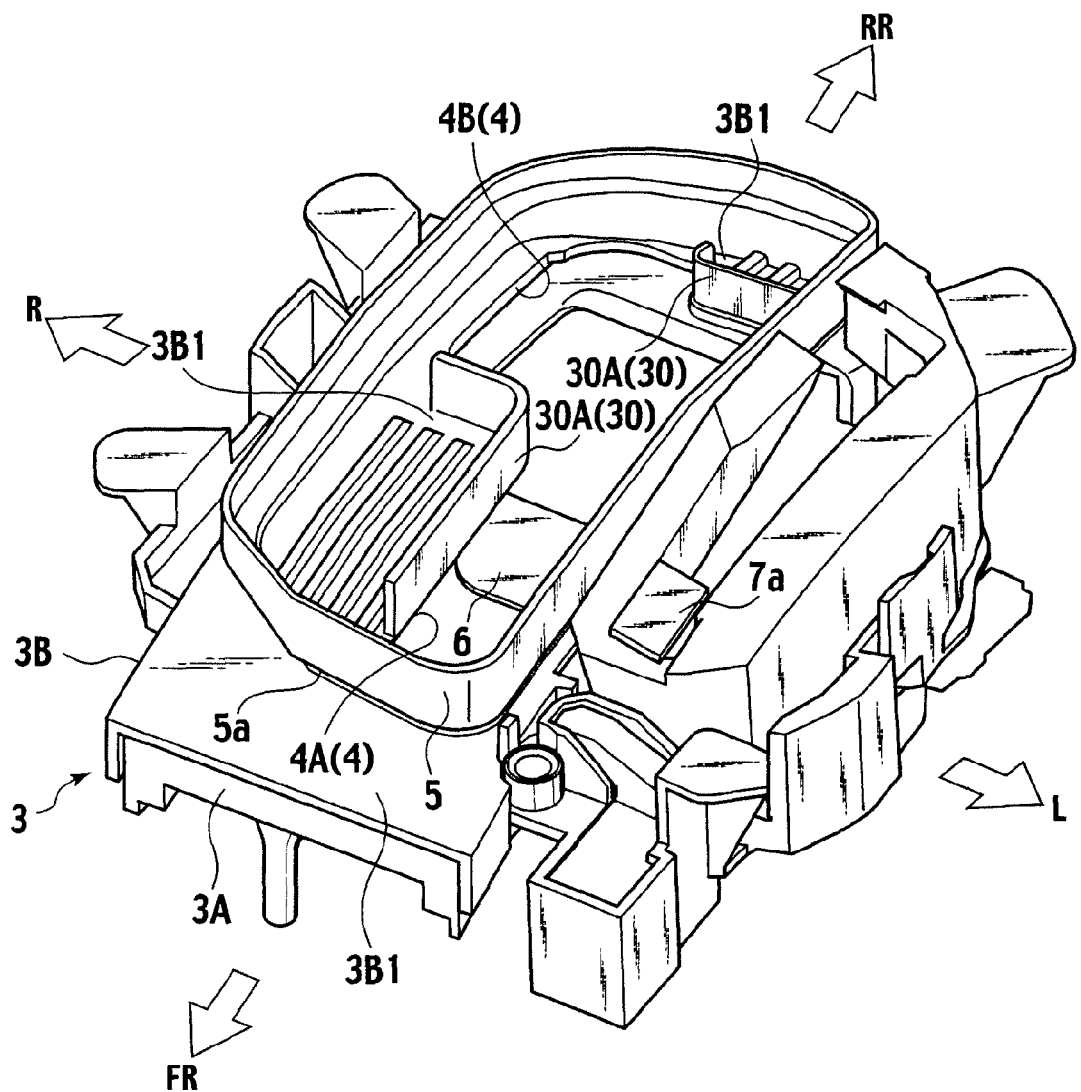
FIG. 2 is a perspective view showing an indicator base of the first embodiment according to the present invention as viewed from a vehicle front area.
Figure 3:
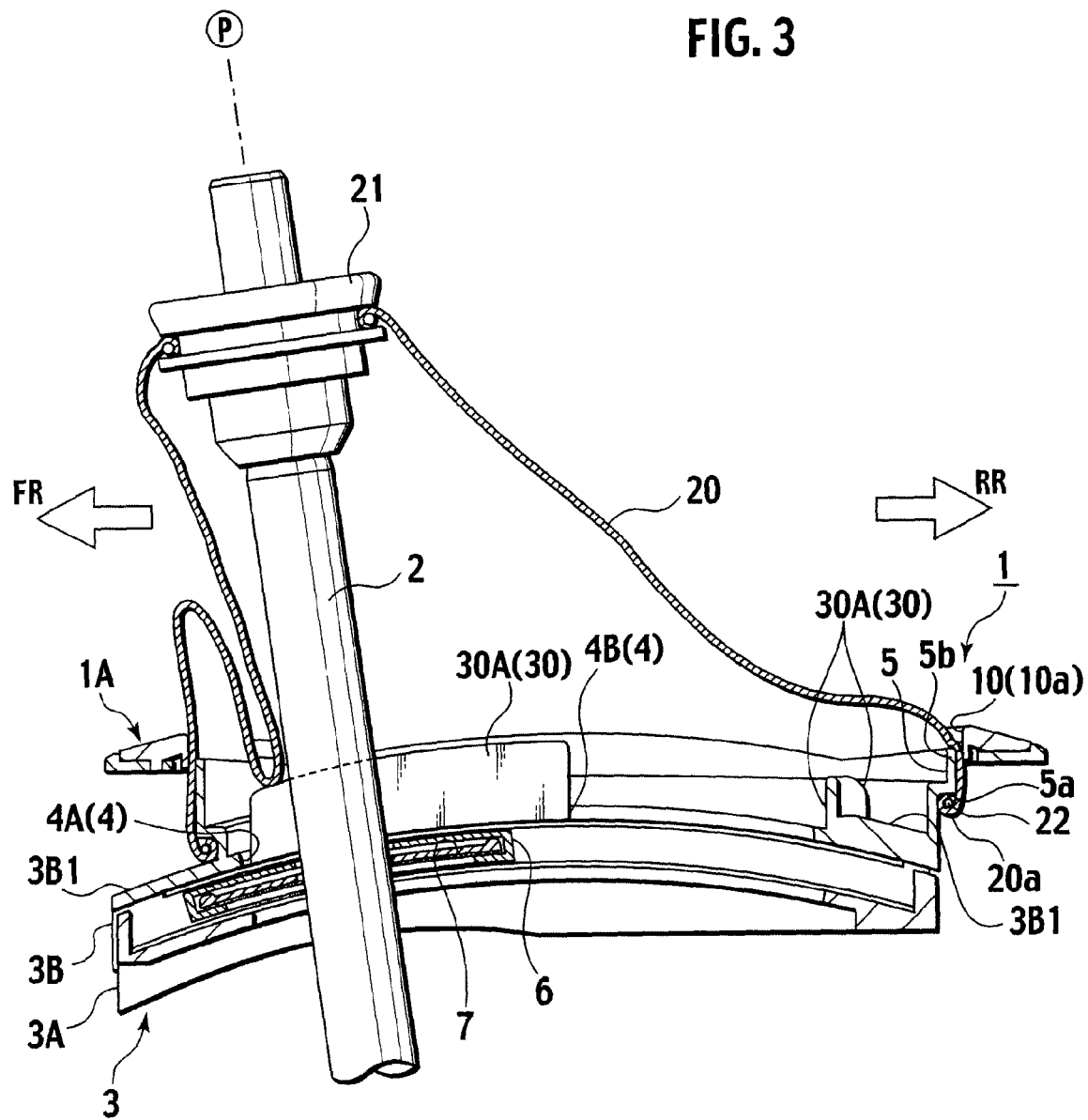
FIG. 3 is a cross sectional view taken on line A-A of FIG. 1 showing a status under which a shift lever is shifted to a "P" range in the first embodiment according to the present invention.
Figure 4:
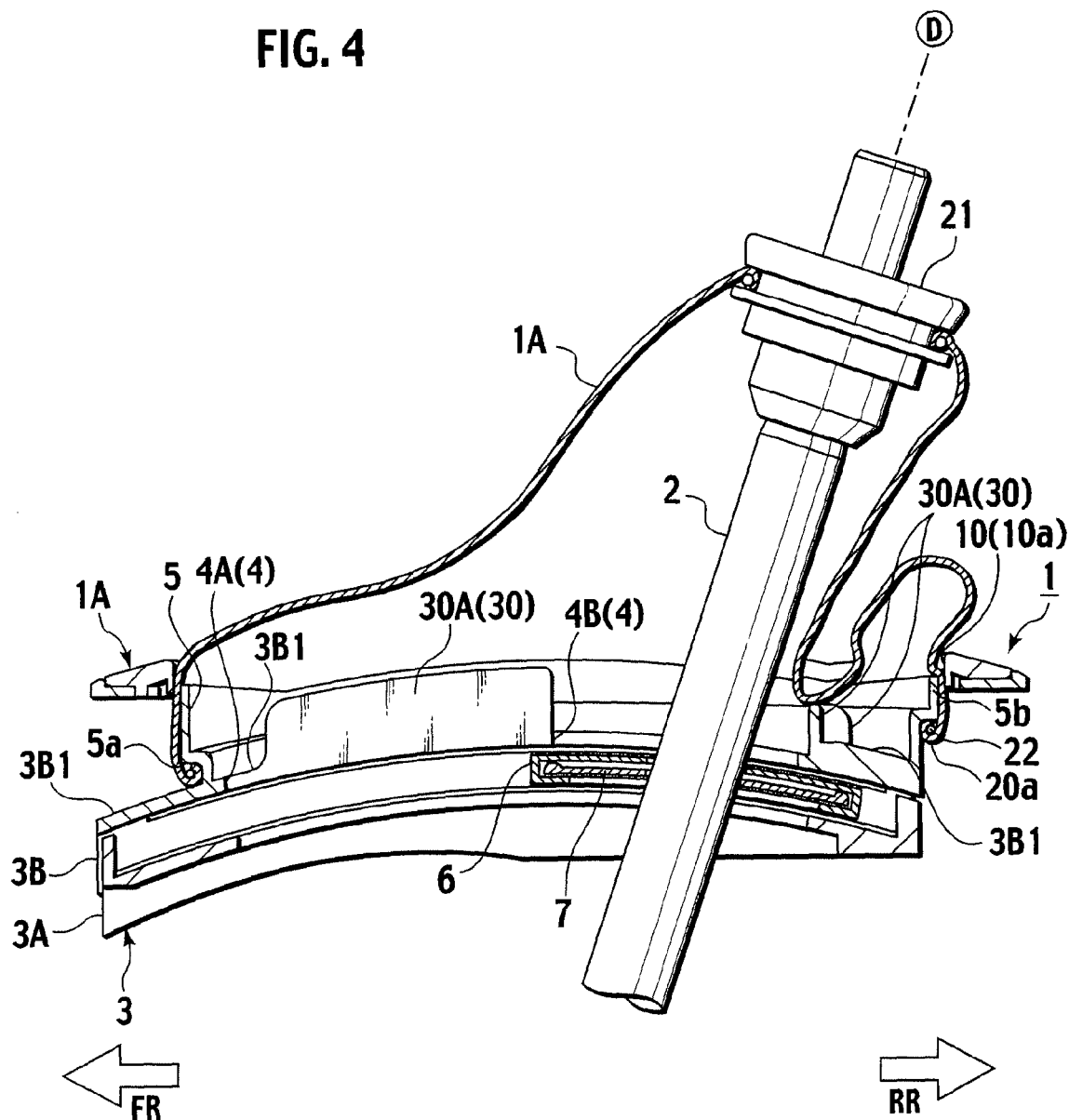
FIG. 4 is a cross sectional view taken on line A-A of FIG. 1 showing a status under which the shift lever is shifted to a "D" range in the first embodiment according to the present invention.

FIGS. 1 to 4 show a first embodiment of an indicator of an AT/T vehicle according to the present invention. FIG. 1 is an overall perspective view of an indicator; FIG. 2 is an indicator base as viewed from a vehicle front; FIG. 3 is a cross sectional view taken on a line A-A of FIG. 1 showing a shift lever shifted in a "P" range; and FIG. 4 is a cross sectional view taken on the line A-A of FIG. 1 showing the shift lever shifted in a "D" range. Also in the following description, it is to be understood that such reference characters "R", "L", "FR" and "RR" refer to "a vehicle's rightward direction", "a vehicle's leftward direction", "a vehicle front" and "a vehicle rear", respectively.

The indicator 1 of the present embodiment is disposed on a floor console section in an area near the driver's seat that is not shown.

A shift lever 2, inserted to the indicator in a vertical direction, is arranged to move in a vehicle's longitudinal direction to select each of "P", "R", "N" and "D" ranges in an automatic mode while making it possible to permit a shift of the shift lever 2 from a given "D" range in a vehicle's lateral direction for selecting ranges in a manual mode.

With the present embodiment, for a left-hand drive car, the shift lever 2 is configured to move in a right direction (vehicle's right direction) in FIG. 1 for selecting the ranges in the manual mode.

The indicator 1 comprises an indicator base 3, fixedly secured onto the floor console section, and an indicator upper 1A mounted on the indicator base 3 so as to cover the same.

With the present embodiment, the indicator base 3 includes a base body 3A, substantially fixed onto the front console section, and an inner frame 3B disposed on a shift lever inserting portion of the base body 3A.

The base body 3A, the inner frame 3B and the indicator upper 1A are made of synthetic resin, and the inner frame 3B and the indicator upper 1A are fixed to the base body 3A by means of a fixture means that is not shown.

The inner frame 3B is formed with a bottom wall 3B1 as shown in FIG. 2. The bottom wall 3B1 is formed with first and second move permit holes 4A, 4B, with the first and second move permit holes 4A, 4B being formed in substantially L-shape configurations on a plane. The first move permit hole 4A extends in a longitudinal direction to allow the shift lever 2 to select ranges "P" to "D" in an automatic mode. In addition, the second move permit hole 4B extends from a rear distal end of the first move permit hole 4A in a rightward direction as shown in FIGS. 1 and 2, making it possible to select ranges in a manual mode of the shift lever 2 from the "D" range in the automatic range.

Further, an annular flange portion 5 integrally stands upright from the bottom wall 3B1 so as to protrude upward in a given size and shape so as to surround the shift lever move permit hole 4, that is, in the same size and shape as those of an open window portion 10 of the indicator upper 1A that will be described below in detail.

As shown in FIG. 3, the annular flange portion 5 has a lower end whose outer periphery is formed with a jowl portion 5a to which a lower terminal edge 20a of the shift lever boot 20, described below, is fixedly secured.

Further, first and second slide plates 6, 7 are disposed between the base body 3A and the inner frame 3B.

With the shift lever 2 inserted through the first slide plate 6, the first slide plate 6 slides in the vehicle's longitudinal direction with shifting operation of the shift lever displaced in the automatic mode along a guide rail, which is not shown, in the vehicle's longitudinal direction.

Further, the shift lever 2 is also inserted through the second slide plate 7 that is held by the first slide plate 6. The second slide plate 7 is structured such that as the shift lever 2 is moved for shifting operation in the automatic mode, the second slide plate 7 slides unitarily with the first slide plate 6 in the vehicle's longitudinal direction to cause the shift lever 2 to shift to the "D" range in the manual mode, the second slide plate 7 is caused to slide with the shifting operation of the shift lever 2 displaced in the vehicle's lateral direction (in the rightward direction in FIG. 1) with respect to the first slide plate 6.

The second slide plate 7 has a range number display portion 7a, colored in a red color representing a range position of the shift lever 2, which integrally extends in the vehicle's lateral direction as shown in FIG. 2.

Meanwhile, the indicator upper 1A is formed with the open window portion 10 (see FIG. 1) in a substantially oblong shape on a plane, through which the shift lever 2 extends, with a size surrounding a move area of the shift lever 2 in the vehicle's longitudinal direction and the vehicle's lateral direction.

Accordingly, the annular flange portion 5 is formed in the same annular configuration in the substantially oblong shape on the plane as that of the open window portion 10 in an area nearly just below the open window portion 10 of the indicator upper 1A and has a height to be close to a lower surface of the indicator upper 1A.

As shown in FIG. 1, further, a row of range marks 11 to 14 for the shift positions "P" to "D" for the automatic mode is provided on the upper indicator 1 at an area on left side of the open window portion 10 in a longitudinal direction thereof, with the range marks 15, 16 for manual mode being located in an area on right of the "D" range mark 14.

Furthermore, a plurality of sight-through windows 17 are formed in areas between sides of the range marks 11 to 14 and the range marks 15, 16 to allow the range display portion 7a of the second slide plate 7 to be visually checked.

Accordingly, the range display portion 7a is set such that on moving the shift lever 2 to select the respective ranges "P", "R", "N" and "D" and selecting the range for the manual mode from the "D" range, a red colored range position is displayed at a position below the sight-through windows 17 in alignment with these range positions.

Here, the shift lever boot 20, made of soft material such as leather or the like, is mounted in an area covering a circumferential portion of the open window portion 10 of the indicator upper 1A and an upper end portion of the shift lever 2, that in, more particularly, to a position beneath a knob 2a.

The shift lever boot 20 has a lower end formed in an oblong shape in cross section along the vehicle's longitudinal direction and is formed as a cover tapered in a decreased diameter as the shift lever boot 20 extends to an upper end thereof. The upper end of the shift lever boot 20 has a lever-clamping portion 21 for permitting the shift lever boot 20 to extend upward so as to fixedly secure the upper end of the shift lever boot 20 thereto. A binding member 22, made of a steel wire, is stitched on the lower terminal edge 20a in an annular pattern.

Before the indicator upper 1A is mounted onto the indicator base 3 in fitting engagement therewith, the shift lever boot 20 is mounted such that a lower end portion of the shift lever boot 20 is fitted to an outer periphery of the annular flange portion 5 of the inner frame 3B upon which the binding member 22, attached to the lower terminal edge 20a, is elastically fitted to the jowl portion 5a of the annular flange portion 5. In addition, when fixing the indicator upper 1A to the indicator base 3 in mating engagement, the shift lever boot 20 is pulled out of the open window portion 10 in an upward direction.

Further, the upper end of the shift lever boot 20 has an upper end mounted on an upper portion of the shift lever 2 in a locked state so as to allow the lever-clamping portion 21 to be inserted when the shift lever 2 through the indicator 2. At this moment, the knob 2a of the shift lever 2 is mounted onto the upper end of the shift lever 2 upon mounting the shift lever boot 20.

Here, a boot penetration restricting device 30 is provided in an area inward the open window portion 10 of the indicator 1 for restricting the shift lever boot 20 from flexing and penetrating into a downward area of the open window portion 10.

With the present embodiment, as shown in FIG. 2, the boot penetration restricting device 30 takes the form of a structure of peripheral walls 30A that stand upright in given heights. The peripheral walls 30A stand upright the bottom wall 3B1, present inward of the annular flange portion 5 of the inner frame 3B acting as the bottom wall of the indicator base 3 and exposed to the open window portion 10 of the indicator upper 1A, in areas along an edge portion of the shift lever move permit hole 4.

The peripheral walls 30A may be formed in an overall peripheral edge of the shift lever move permit hole 4 so as to stand upright with the same height as that of the annular flange portion 5 or slightly less than that of the annular flange portion 5 or may be formed in desired positions.

That is, the shift lever boot 20 is formed in a size with an adequate margin so as to avoid a front side or a rear side of the shift lever boot 20 from stretching even under a situation where the shift lever boot 20 is moved in the vehicle front or vehicle rear direction in a great extent, that is, even when the shift lever 2 is moved to the "P" range or "D" range in the automatic mode. Therefore, the front side of the shift lever boot 20 has an increased flexing rate when the shift lever 2 is moved to the "P" range. In contrast, when the shift lever is shifted to the "D" range, the rear side of the shift lever boot 20 has an increased flexing rate. Thus, the peripheral walls 30A may be suffice to be provided merely in the front and rear areas of the shift lever move permit hole 4.

Therefore, with the present embodiment, the peripheral walls 30A are formed on the bottom wall 3B1 jutting out to a front corner area inside the annular flange portion 5 and the bottom wall 3B1 jutting out to a rear corner area inside the annular flange portion 5, respectively.

That is, although the bottom wall 3B1 of the inner frame 3B is formed in outside and inside areas of the annular flange portion 5, the bottom wall 3B1, having a substantially oblong shape as viewed on a plane, is formed in the right corner portion on the vehicle's front side and the left corner portion on the vehicle's rear side in areas inside the annular flange portion 5. The peripheral walls 30A stand upright in the areas along peripheral edges of the bottom wall 3B1 formed in the front corner portion and the rear corner portion.

Further, as the boot penetration restricting device 30, an upper end 5b of the annular flange portion 5 and an inner peripheral edge 10a of the open window portion 10 pinch a lower end portion of the shift lever boot 20.

In addition, as the boot penetration restricting device 30, the binding member 22, mounted to the lower terminal edge 20a of the shift lever boot 20, is resiliently fixed to the jowl portion 5a of the annular flange portion 5.

With the structure of the present embodiment set forth above, as the shift lever 2 is shifted to the "P" range as shown in FIG. 3, the front side of the shift lever boot 20 is greatly flexed and, further, as the shift lever 2 is shifted to the "D" range as shown in FIG. 4, the rear side of the shift lever boot 20 is greatly flexed. Here, since the boot penetration restricting device 30 is disposed inside the open window portion 10 of the indicator 1 for restricting the shift lever boot 20 from flexing penetrating downward into the lower area, the boot penetration restricting device 30 restricts the flexing and penetration of the shift lever boot 20.

As a result, even under a circumstance where a shift lever move permit aperture 4 is located in close proximity to the lower area of the open window portion 10, the shift lever 2 and the peripheral edge of the shift lever move permit aperture 4 can be reliably prevented from biting the shift lever boot 20.

With the present embodiment, further, since the boot penetration restricting device 30 is structured with the peripheral walls 30A standing upright from the edge portion of the shift lever move permit aperture 4 with a given height, the peripheral walls 30A can be easily formed with the resultant advantage of a reduction in cost.

Furthermore, the lower end of the shift lever boot 20 is mounted so as to be fitted and fixed to the outer periphery of the annular flange 5, formed on the bottom wall 3B1 of the indicator base 3, at a position substantially just below the peripheral edge of the open window portion 10 of the indicator upper 1A such that the shift lever boot 20 extends upward of the open window portion 10 of the indicator upper 1A. Therefore, the shift lever boot 20 can have increased quality sense without creating any gap between the shift lever boot 20 and the peripheral edge of the open window portion 10.

Next, a second embodiment according to the present invention is described.

Figure 5:
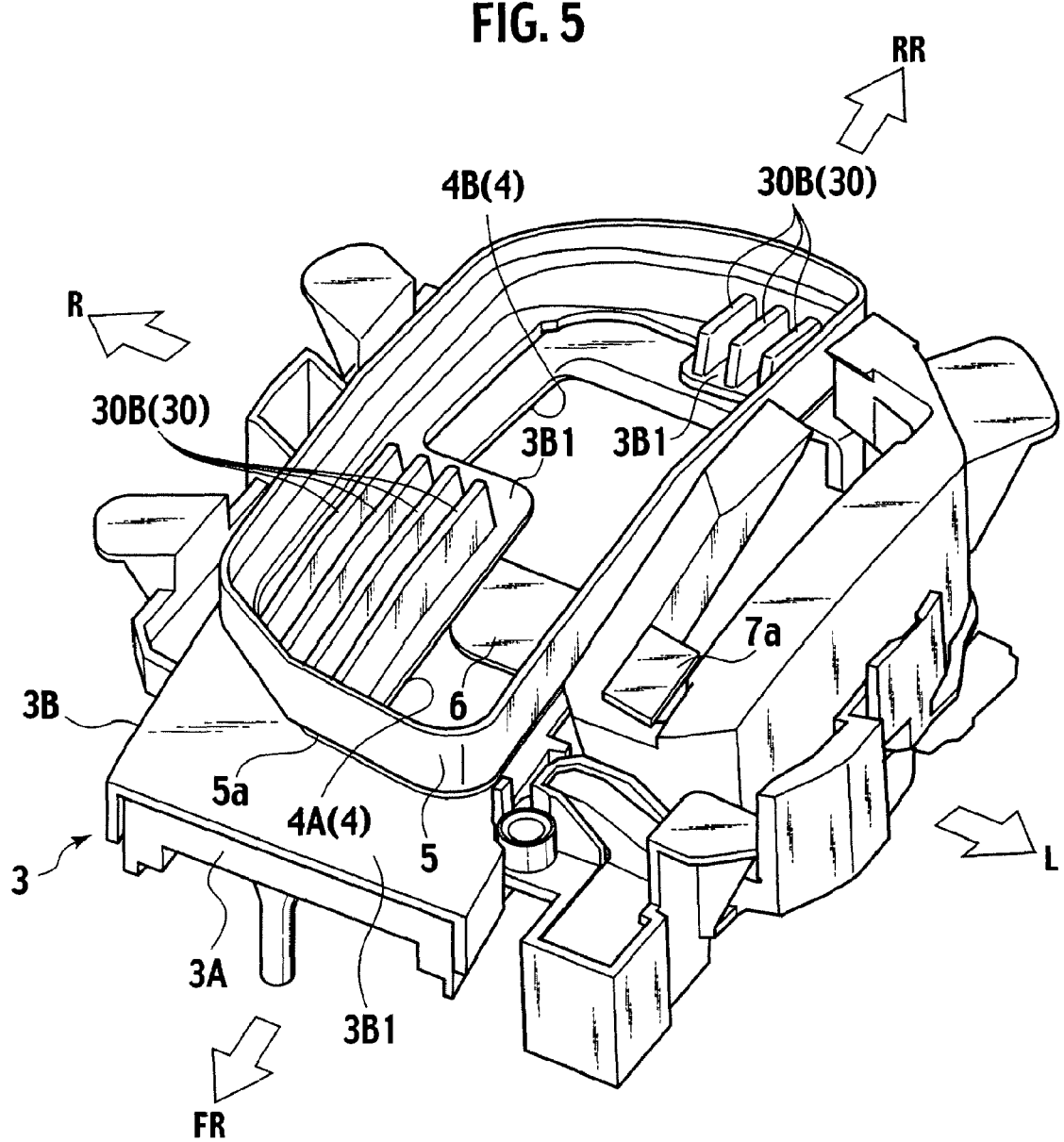
FIG. 5 is a perspective view similar to FIG. 2 for illustrating a second embodiment according to the present invention.

With the second embodiment, rib walls 30B are integrally formed with the bottom wall 3B1 of the indicator base 3, thereby forming the boot penetration restricting device 30 as shown in FIG. 5.

A plurality of rib walls 30B extend from an upper surface of the bottom wall 3B1, formed in areas covering the front side corner and the rear side corner inside the annular flange 5, in vehicle's longitudinal direction with the same height as that of the peripheral wall 30A. Even in this case, the rib walls 30B can be easily formed, providing an advantage with low cost.

Figure 6:
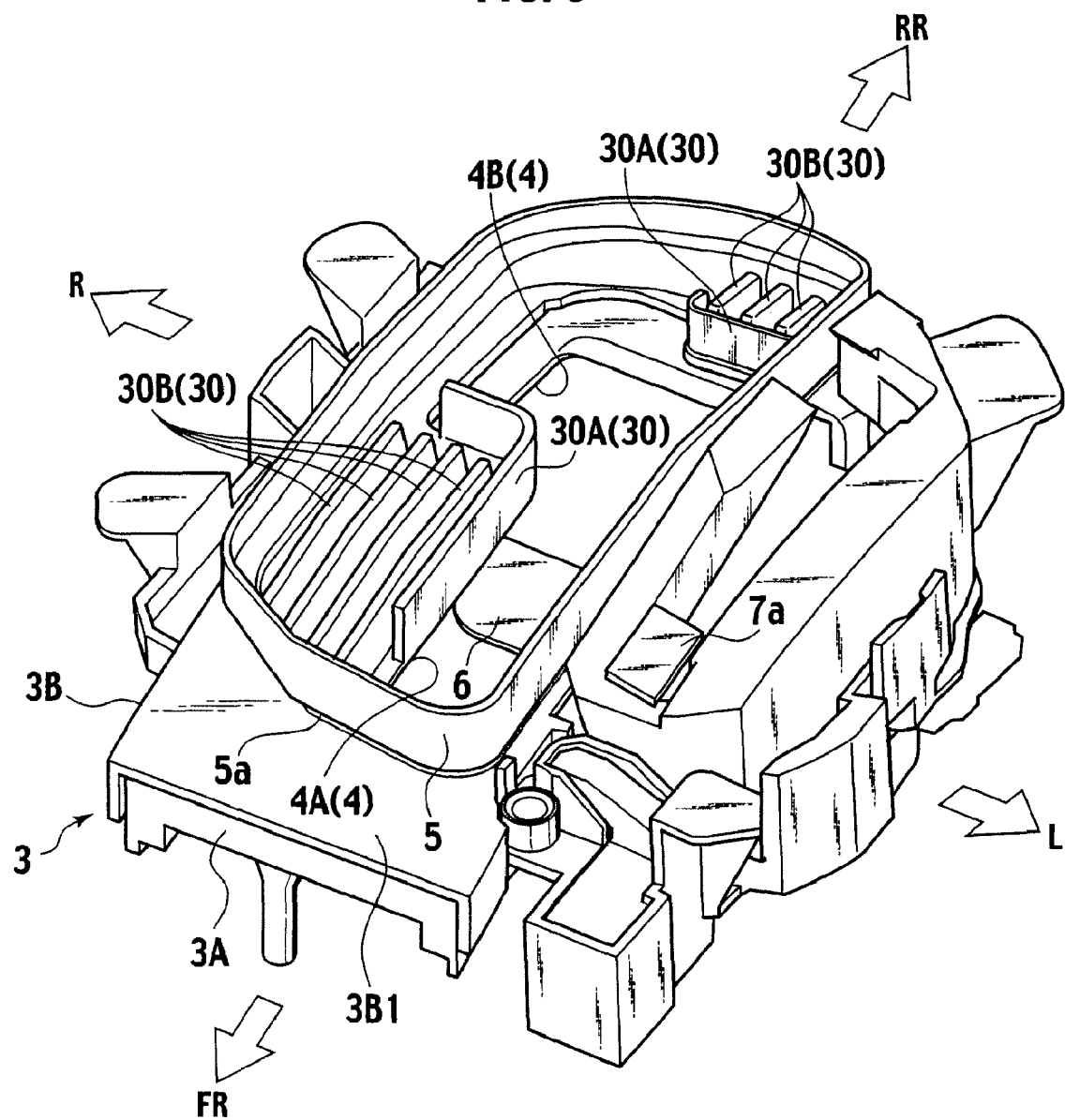
FIG. 6 is a perspective view similar to FIG. 2 for illustrating a third embodiment according to the present invention.

Next, a third embodiment according to the present invention is described. With the third embodiment, both of the peripheral wall 30A, shown in FIG. 2, and the ribs 30B, shown in FIG. 5, are formed thereby forming the boot penetration restricting device 30 as shown in FIG. 6. The peripheral wall 30A and the ribs 30B are integrally formed on the bottom wall 3B1 of the indicator base 3 with the substantially same height.

Even with such a third embodiment, the presence of the peripheral wall 30A and the ribs 30B restricts the flexing and penetration of the shift lever boot 20. In addition, the peripheral wall 30A and the ribs 30B can be easily formed, providing an advantage with low cost.

Meanwhile, although the present invention has been described with reference to the examples related to the various embodiments, the present invention is not limited to such embodiments and various other embodiments can be employed without departing from the scope of the present invention. For instance, a display of the shift position can be implemented using an electrical illumination type, such as LEDs or the like, in place of the mechanical type.

Figure 7:
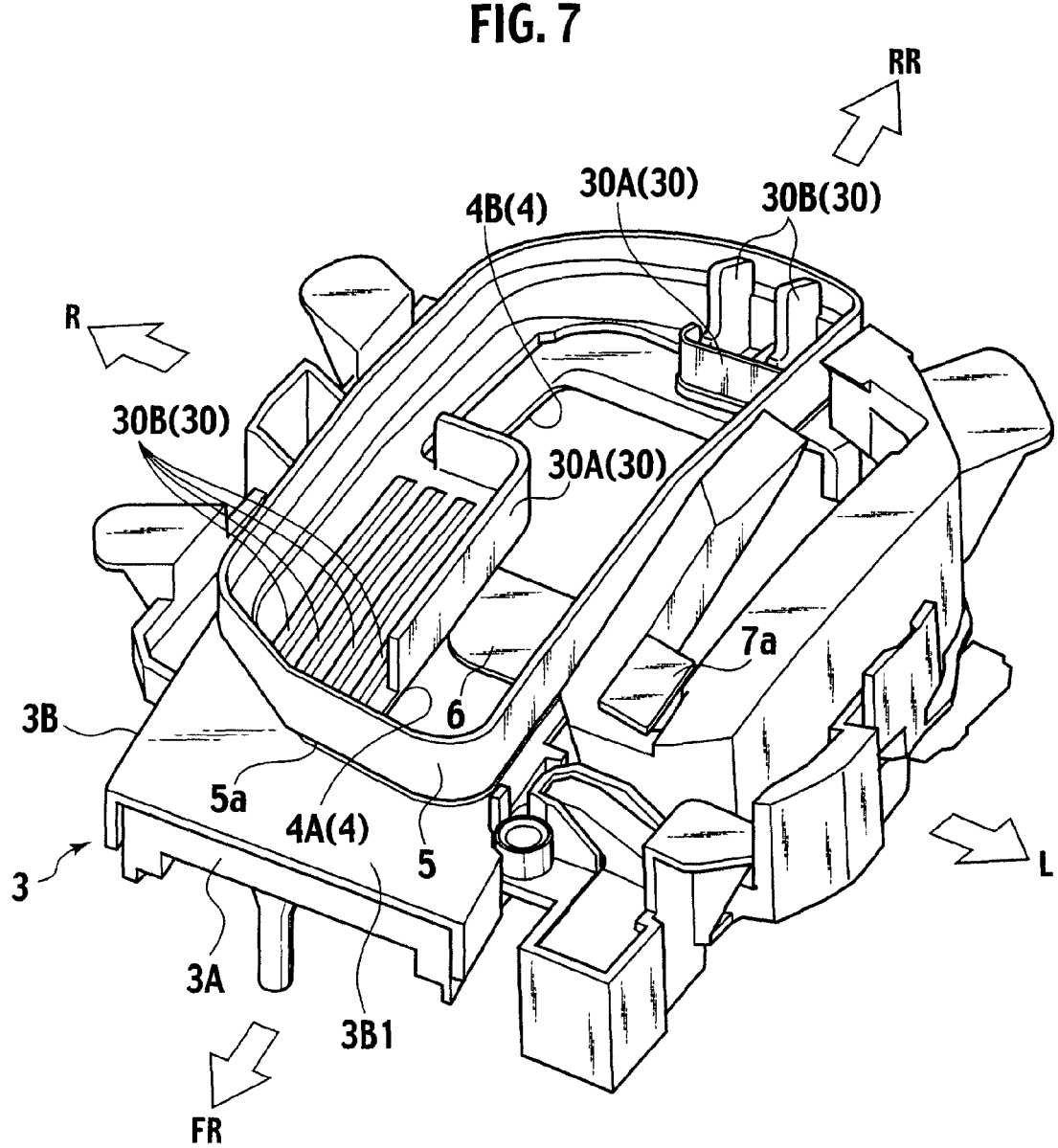
FIG. 7 is a perspective view similar to FIG. 2 for illustrating another embodiment according to the present invention.

Further, the peripheral wall 30A and the ribs 30B have heights with no need to be set to the same dimensions. The peripheral wall 30A may have a larger height than those of the ribs 30B. In an alternative, the ribs 30B may have larger heights than that of the peripheral wall 30A. For instance, as shown in FIG. 7, the peripheral wall 30A may have a larger height than those of the ribs 30B as shown in FIG. 7. This is because of the fact that as a shift-down is effectuated under the manual mode, the shift lever boot 20 is moves further rearward of the vehicle than the "D" range position followed by an increase in the amount of flexing. Also, increasing the heights of the rib walls 30B extending along the vehicle's longitudinal direction enables the shift lever boot 20 to be restricted from penetrating in a further reliable fashion.

The entire contents of a Japanese Patent Application No. P2005-340806 with a filing date of Nov. 25, 2005 and a Japanese Patent Application No. P2006-249864 with a filing date of Sep. 14, 2006 in Japan are herein incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A shift lever assembly for an AT vehicle, comprising:
   a shift lever boot made of soft material, which is attached onto a peripheral edge portion of an open window portion, through which a shift lever extends, an upper end portion of the shift lever protrudes upward through the open window portion;
   a boot penetration restricting device provided in an inside of the open window portion;
   an indicator base member having a shift lever hole permitting movement of the shift lever including a first hole, enabling the shift lever to move in a longitudinal direction of the vehicle for selecting a range in an automatic mode, and a second hole, enabling the shift lever to move in a lateral direction of the vehicle from a given range in the automatic mode for selecting a range in a manual mode; and
   an indicator upper mounted on the indicator base member so as to cover an upper area thereof and having the open window portion formed in a size surrounding travel areas of the shift lever in the longitudinal direction and lateral direction of the vehicle; and
   wherein the indicator base member is integrally formed with an annular flange portion that upwardly protrudes at a position substantially just below a peripheral edge of the open window portion of the indicator upper;

wherein the boot penetration restricting device is arranged to allow a lower end portion of the shift lever boot to be fitted and fixed to an outer area of the annular flange portion, and the boot penetration restricting device is arranged to allow a lower terminal edge of the shift lever boot to be elastically engaged with a jowl portion as a stepped portion formed on the annular flange portion.

2. The shift lever assembly for the AT vehicle according to claim 1, wherein:

the boot penetration restricting device is arranged to allow the lower end portion of the shift lever boot to be clamped between an upper end of the annular flange portion and an inner peripheral edge of the open window portion of the indicator upper.

3. The shift lever assembly for the AT vehicle according to claim 2, wherein:

the boot penetration restricting device comprises:
peripheral walls standing upright from the bottom wall of the indicator base member with given heights in areas along the shift lever hole.

4. The shift lever assembly for the AT vehicle according to claim 2, wherein:

the boot penetration restricting device comprises:
a plurality of ribs standing upright from an upper surface of the bottom wall of the indicator base member with given heights and exposed to the open window portion of the indicator upper that is formed with the shift lever hole.

5. The shift lever assembly for the AT vehicle according to claim 2, wherein:

the boot penetration restricting device comprises:
peripheral walls standing upright from the bottom wall of the indicator base member with given heights and exposed to the open window portion of the indicator upper in areas along an edge portion of the shift lever hole; and
a plurality of rib walls standing upright from the bottom wall of the indicator base member with given heights and exposed to the open window portion of the indicator upper that is formed with the shift lever hole.

6. The shift lever assembly for the AT vehicle according to claim 1, wherein:

the boot penetration restricting device comprises:
peripheral walls standing upright from the bottom wall of the indicator base member with given heights in areas along the shift lever hole.

7. The shift lever assembly for the AT vehicle according to claim 1, wherein:

the boot penetration restricting device comprises:
a plurality of ribs standing upright from an upper surface of the bottom wall of the indicator base member with given heights and exposed to the open window portion of the indicator upper that is formed with the shift lever hole.

8. The shift lever assembly for the AT vehicle according to claim 1, wherein:

the boot penetration restricting device comprises:
peripheral walls standing upright from the bottom wall of the indicator base member with given heights and exposed to the open window portion of the indicator upper in areas along an edge portion of the shift lever hole; and
a plurality of rib walls standing upright from the bottom wall of the indicator base member with given heights and exposed to the open window portion of the indicator upper that is formed with the shift lever hole.

9. A shift lever assembly for an AT vehicle, comprising:

a shift lever boot made of soft material, which is attached onto a peripheral edge portion of an open window portion, through which a shift lever extends, an upper end portion of the shift lever protrudes upward through the open window portion;

a boot penetration restricting device provided in an inside of the open window portion;

an indicator base member having a shift lever hole permitting movement of the shift lever including a first hole, enabling the shift lever to move in a longitudinal direction of the vehicle for selecting a range in an automatic mode, and a second hole, enabling the shift lever to move in a lateral direction of the vehicle from a given range in the automatic mode for selecting a range in a manual mode; and an indicator upper mounted on the indicator base member so as to cover an upper area thereof and having the open window portion formed in a size surrounding travel areas of the shift lever in the longitudinal direction and lateral direction of the vehicle; and wherein the indicator base member is integrally formed with an annular flange portion that upwardly protrudes at a position substantially just below a peripheral edge of the open window portion of the indicator upper;

wherein the boot penetration restricting device is arranged to allow a lower end portion of the shift lever boot to be fitted and fixed to an outer area of the annular flange portion, wherein:
the boot penetration restricting device comprises:
a plurality of ribs standing upright from an upper surface of the bottom wall of the indicator base member with given heights and exposed to the open window portion of the indicator upper that is formed with the shift lever hole.

10. A shift lever assembly for an AT vehicle, comprising:

a shift lever boot made of soft material, which is attached onto a peripheral edge portion of an open window portion, through which a shift lever extends, an upper end portion of the shift lever protrudes upward through the open window portion;

a boot penetration restricting device provided in an inside of the open window portion;

an indicator base member having a shift lever hole permitting movement of the shift lever including a first hole, enabling the shift lever to move in a longitudinal direction of the vehicle for selecting a range in an automatic mode, and a second hole, enabling the shift lever to move in a lateral direction of the vehicle from a given range in the automatic mode for selecting a range in a manual mode; and an indicator upper mounted on the indicator base member so as to cover an upper area thereof and having the open window portion formed in a size surrounding travel areas of the shift lever in the longitudinal direction and lateral direction of the vehicle; and wherein the indicator base member is integrally formed with an annular flange portion that upwardly protrudes at a position substantially just below a peripheral edge of the open window portion of the indicator upper;

wherein the boot penetration restricting device is arranged to allow a lower end portion of the shift lever boot to be fitted and fixed to an outer area of the annular flange portion, wherein:

the boot penetration restricting device comprises:

peripheral walls standing upright from the bottom wall of the indicator base member with given heights and exposed to the open window portion of the indicator upper in areas along an edge portion of the shift lever hole; and a plurality of rib walls standing upright from the bottom wall of the indicator base member with given heights and exposed to the open window portion of the indicator upper that is formed with the shift lever hole.

* * * * *